United States Patent Office 3,741,884
Patented June 26, 1973

3,741,884
ELECTROCHEMICAL ELECTRODE LIQUID JUNCTION STRUCTURE AND METHOD FOR PRODUCING SAME
Maurice L. Deushane, La Habra, and David A. Rohrer, Whittier, Calif., assignors to Beckman Instruments, Inc.
Filed May 4, 1972, Ser. No. 250,279
Int. Cl. G01n 27/30, 27/36
U.S. Cl. 204—195 F                        9 Claims

ABSTRACT OF THE DISCLOSURE

An electrochemical electrode for use in making ion potential measurements of solutions. The electrode embodies a liquid junction structure which is formed by coating the outer surface of a first glass tube with a material containing either a ceramic or an admixture of particles of glass and inert particles. The coated tube is mounted within an opening in a second glass tube and heat is applied to the two tubes in the region of the coating until the coating partially fuses and adheres by fusion to the first tube and the second tube is fused to the coating. The partially fused coating provides an annular porous liquid junction structure through which salt bridge solution may flow to contact a sample.

BACKGROUND OF THE INVENTION

Field of the invention

This invention relates generally to an electrochemical electrode assembly and, more particularly, to a liquid junction structure of a salt bridge tube such as is used in reference electrodes for ion potential measurements of solutions and the method of making the same.

Description of the prior art

In electrochemical measurements a reference electrode is commonly employed in conjunction with a measuring electrode, such as a glass electrode, with both electrodes immersed in a solution, whereby the potential difference between the two electrodes is a function of the activity of the sensed ion in the solution. A typical example is the conventional pH meter and electrode pair used for measuring hydrogen ion activities of solutions.

A reference electrode ordinarily comprises an internal half cell structure supported within a tube containing a salt solution, the tube of salt solution being known as a salt bridge tube. Electrical connection between the salt solution and the sample or test solution is made by liquid contact via a suitably formed aperture or passage in the tube, generally referred to as a liquid junction structure or leak structure. Sometimes the entire unit consisting of the internal half cell structure, the tube, the salt solution and the liquid junction structure is referred to as a half cell; however, for the present specification, the entire unit will be referred to as a reference electrode.

Various means have been utilized for forming the liquid junction structure of a salt bridge tube, including agar gel connections, wicking, asbestos fibers, small capillary tubes, glass tubes with cracks therein, and annular spaces around metal rods molded in openings in the glass tubes. Also, the use of porous sintered plugs as liquid junction structures is known. As disclosed in U.S. Pat. No. 2,925,370 to Rohrer, such a structure may be made by providing a mixture of particles of glass and inert particles, plugging an opening in a salt bridge tube with the mixture and sintering the mixture in situ by heating the mixture to a temperature within the working temperature range of the glass particles and the salt bridge tube. Porous ceramic plugs have also been frequently used as liquid junction structures. A modification of the ceramic type of liquid junction structure is shown in U.S. Pat. No. 2,755,243 to Beckman et al. In this patent there is disclosed the use of a ceramic slip, a thick slurry of clay-like material, which is applied to the end of a salt bridge tube of a reference electrode. The ceramic slip is partially fused to cause it to adhere by fusion to the tube. In one embodiment, an electrochemical measuring electrode is mounted concentrically within the salt bridge tube and is sealed thereto by means of a rubber ring thereby providing a combination reference-measuring electrode. The partially fused ceramic slip fused on the salt bridge tube provides an annular liquid junction structure which, because of its large area exposed to the sample, is not easily plugged or clogged by multi-phase samples or slurries. A more typical combination electrode for making ion potential measurements is disclosed in U.S. Pat. No. 2,755,243 to Beckman et al. In this patent there is disclosed an assembly in which the salt bridge tube of the reference electrode is sealed either by fusing or a suitable cement to the sensing electrode mounted concentrically therein. The liquid junction structure is provided by means of an asbestos fiber or ceramic plug which is located in the salt bridge tube above the seal between the tube and the sensing electrode. Swiss Pat. No. 216,813 shows a combination electrode in which an annular filter of undisclosed composition interconnects the lower end of the outer salt bridge tube to the glass electrode mounted concentrically therein.

Some of the prior art liquid junction structures mentioned above have the disadvantage that they involve slow and costly methods of fabrication and produce undesirably large flow of salt solution or flow at insufficient velocity to maintain the passage or passages clear of contaminating substances. Also, some of the liquid junction structures become easily plugged or clogged and are not readily cleaned. In the case of the aforementioned prior art combination electrodes, the liquid junction structure is spaced substantially from the ion sensitive barrier of the sensing electrode, thus requiring relatively large quantities of sive test solutions. What is needed, therefore, is an electrodes employing rubber rings as sealing members are often adversely affected by high temperatures and corrosive test solutions. What is needed, herefore, is an electrode assembly which overcomes these disadvantages.

SUMMARY OF THE INVENTION

It is the principal object of the present invention to provide an improved liquid junction structure for an electrochemical reference electrode or a combination electrode and a simple and relatively inexpensive method of producing the same.

According to the principal aspect of the present invention, there is provided an improved liquid junction structure for an electrochemical electrode and a method for producing the same. The liquid junction structure is provided by coating the outer surface of a first glass tube with a material containing either a ceramic or an admixture of particles of glass and inert particles. In one embodiment of the invention, the coated tube is then mounted within an opening in a second glass tube and heat is applied to the two tubes in the region of the coating until the coating partially fuses and adheres by fusion to the first tube and the second tube is fused to the coating. Alternatively, the coating may be fired on the first tube prior to mounting the same in the second tube. Thereafter the first tube is mounted in the second tube and the latter is heated to fuse the same to the partially fused coating on the first tube. The partially fused coating provides a porous liquid junction structure through which salt bridge solution may flow to contact a sample. It can be appreciated that by the method of the first-mentioned embodiment of the present invention a liquid junction structure is formed and a firm bond is made between the two glass tubes of the assembly in a single step thereby requiring fewer steps and parts than prior art electrode assemblies of similar construction. Also, by each embodiment of the present invention there is provided in an all-glass assembly an annular liquid junction through which flow of salt bridge solution can be easily started, does not become clogged in multi-phase systems, and can be easily cleaned when contaminated.

DESCRIPTION OF THE PREFERRED EMBODIMENTS

Figures 1, 2:
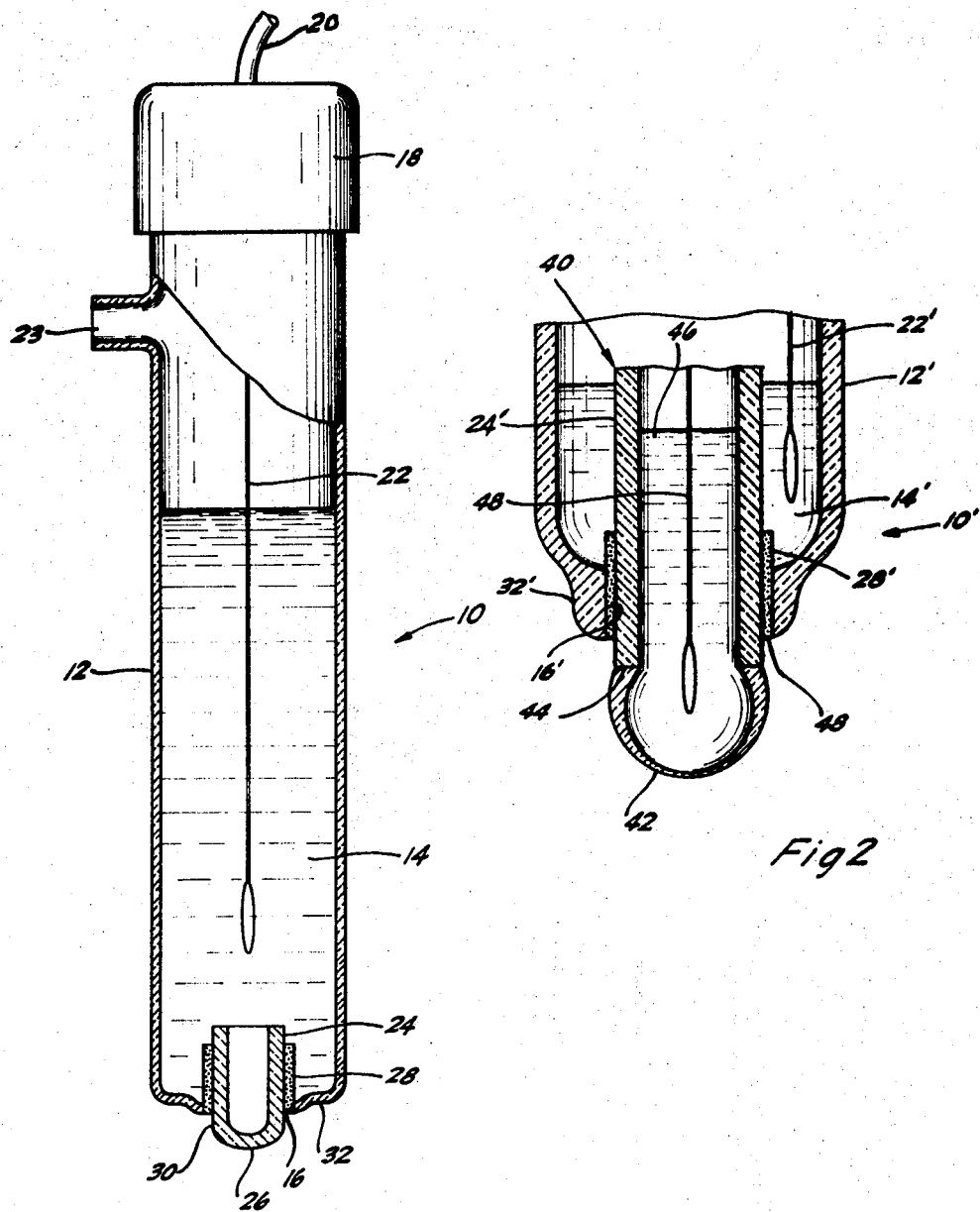
FIG. 1 is a partial longitudinal sectional view of an electrochemical reference electrode embodying the liquid junction structure of the present invention.
FIG. 2 is an enlarged view, in longitudinal section, of the lower end of a combination electrode assembly incorporating the liquid junction structure of the invention.

Referring now to FIG. 1, there is shown a reference electrode of the type used in electrochemical determinations such as pH measurements. The electrode, generally referred to by numeral 10, comprises a glass salt bridge tube 12 containing a salt bridge solution 14. The tube is formed with a circular opening 16 at its lower end. The top of the tube 12 is closed by a cap 18 having a cable 20 attached to an internal half cell 22 immersed in the salt bridge solution 14. The internal half cell 22 is shown as being a silver wire coated with silver chloride, but may also take the form of a calomel half cell or other conventional half cell including a metal and a sparingly soluble salt of said metal. The cable 20 has a connector at its end, not shown, which is adapted for connection to a pH meter in a known manner. A filling port 23 is provided in the salt bridge tube 12 to permit replenishment of the solution 14.

A cylindrical tube 24 of nonconductive glass is concentrically mounted within the opening 16 of the salt bridge tube 12. The lower end 26 of the tube is closed as shown. A coating 28 of porous material is bonded onto the outer surface 30 of the tube 24. The lower end 32 of the salt bridge tube 12 which forms the opening 16 is likewise bonded or fused to the coating 28. As seen in FIG. 1, the coating 28 extends from the interior to the exterior of the tube 12 so that there is provided an annular liquid junction structure for allowing flow of a salt solution 14 to the sample in contact with the electrode 10.

In general, the porous material which forms the liquid junction structure 28 contains either a ceramic or an admixture of particles of glass and inert particles (as hereinafter described). Various combinations of these ingredients could also be used so long as the final product contains at least a ceramic material or an admixture of glass particles and particles of inert material. For example, the liquid junction structure could be formed of ceramic and glass particles or ceramic mixed with inert particles. As well known in the art, ceramic is a clay-like material. Conventional ceramics usually contain $MgSi_4O_7$, $CaSi_4O_7$ and $Al_2O_3 \cdot 2SiO_2$. Suitable ceramic materials which we have found for use in practicing the present invention are ceramic slips sold under the trade names Silk-Tex Slip by Quality Plus Ceramics Company of Reseda, Calif., and Butcher Type 3000 by Westwood Ceramic Supplies of Westwood, Calif. These products have been analyzed by spectral analysis and found to contain Si, Mg, Al, Na, K, Ca, Fe, Ti and traces of other metals. Another suitable ceramic slip is Wards' Artware Casting Body sold by S. Paul Ward, Inc. of South Pasadena, Calif. This ceramic contains 50 parts of Talc Cercron CF 96–38, 16⅔ parts of Plastic Vitrox, 16⅔ parts Tennessee #1 SCP Ball Clay, 16⅔ parts Kentucky #4 Ball Clay and 2½ parts Kentucky Special Ball Clay. Chemical analysis of a typical sample of this ceramic shows that the mixture contains major portions of Si and Al and minor portions of Ti, Fe, Ca, Mg, K and Na. Still another suitable ceramic for use in the present invention contains 65% Yellowstone Talc ($MgSi_4O_7$), 25% EPK-Kaolin $$(Al_2O_3 \cdot 2SiO_2 \cdot 2H_2O + SiO_2)$$

and 10% sodium silicate. This ceramic will hereinafter be referred to as Beckman Ceramic Type A.

When using an admixture of glass and inert particles for forming the liquid junction structure 28, the glass is preferably finely ground and has a fusing temperature within the range of the working temperatures of the glass of the tubes 12 and 24. Preferably the glass will have a coefficient of thermal expansion approximately equal to the glass of such tubes. The glass of the mixture may well be the same glass as that of the tubes 12 and 24 or very similar thereto. For example, with conventional borosilicate glass tubes, a ground borosilicate glass passing a 150 mesh screen is suitable. The terminology "inert particles" means an "infusible" material that is physically and chemically inert at sintering temperatures. By the term physically and chemically inert, reference is made to a material that will neither melt, volatilize or disintegrate at sintering or fusing temperatures of the glass of the mixture and will not dissolve or react appreciably with the glass tube. Examples of suitable inert materials are alundum (aluminum oxide), potassium silicate, Carborundum (silicon carbide), zirconia (zirconium oxide) and any of the other inert materials disclosed in the aforementioned Rohrer patent.

In fabricating the electrode 10, the glass tube 24 is formed or selected such that its outer diameter is somewhat less than the diameter of the opening 16 in the end of the salt bridge tube 12. Then any one of the materials discussed hereinabove as constituting the liquid junction structure material is applied in the form of a coating to the outer surface 30 of the tube 24. Preferably the materials are mixed with a suspension medium or binder such as water, tetrahydrofuran (THF) or Parlodion, which is a 5% mixture of nitrocellulose in methyl alcohol. In the case of the aforementioned commercial ceramic slip materials, such are thick slurry materials in water which require no additional binder medium. The coating material may be applied to the tube 24 in any suitable manner, as by painting, spraying, dipping, etc. After a coating of desired thickness is obtained on the tube 24, the coating is thoroughly dried. The tube, with the coating 20, is then concentrically positioned within the opening 16 in the salt bridge tube 12 with the lower end or lip 32 of the tube aligned with the coating. Heat is then applied to the tubes 12 and 24 in the region of the coating 28, preferably by means of an open flame.

When the coating contains ceramic material, it must be heated to a temperature sufficient to partially fuse the ceramic mass but not sufficient to cause it to run and totally fuse. An over-fired coating will become impervious to water penetration and thus be useless as a liquid junction. Although the temperature range for proper fusion varies from material to material, generally speaking a ceramic mass should be heated to a temperature of approximately 800° C. when the glass of the tubes 12 and 24 is Corning 7720 Pyrex glass which is a borosilicate glass. It is also necessary that the tubes 12 and 24 be heated above the softening point of the glass so that the coating 28 will form a firm bond with the outer surface of the tube 24 and the lower end 32 of tube 12 will fuse to the coating 28 after the assembly has been cooled. Reference may be had to the aforementioned Leonard et al. patent for a more detailed description as to how a ceramic liquid junction is formed.

When the coating 28 contains an admixture of glass and inert particles as discussed hereinabove, it is heated to a sufficient temperature to sinter the mixture, thereby forming a porous annular junction structure. If the fusing temperature of the glass of the mixture is within the working temperature range of the glass of the two tubes 12 and 24, the coating 28 will become permanently fused to the tubes at their juncture with the coating by bonding of the glass particles of the sintered mass to the glass of the tubes. Reference may be made to the aforementioned Rohrer patent for a further discussion of the method of producing a porous liquid junction structure of this nature.

It will be appreciated that the ratios of the ingredients utilized in any of the mixtures used for forming the liquid junction structure 28 will be dependent upon the flow rate of salt bridge solution desired by the user, and the composition of the glass tubes 12 and 24. Likewise, different types of ingredients in the mixtures may be utilized depending on the results desired.

It can be seen that by the present invention there is simultaneously formed in a single operation a porous liquid junction structure and a firm bond between the salt bridge tube 12 and inner tube 24. Moreover, there is provided an annular liquid junction structure which does not become easily clogged and can be easily cleaned when contaminated. Other advantages of the invention will become more apparent by referring to the description of the embodiment shown in FIG. 2 which is in the form of a combination glass-reference electrode.

Referring now to FIG. 2 of the drawing, the basic structure is as previously described and like numbers primed are used to indicate like or corresponding parts. The combination electrode 10' illustrated in FIG. 2 includes a sensing electrode 40, which includes a glass tube 24' that is closed at its lower end by an ion sensitive barrier 42. As shown, the barrier 42 is in the form of an ion sensitive glass bulb which is fused to the lower end 44 of the tube 24'. However, it is to be understood that the barrier 42 may be formed of any other ion sensitive material as is well known in the art. The tube 24' contains a suitable electrolyte 46 in which there is immersed a silver-silver chloride half cell 48.

The liquid junction structure 28' surrounds the lower portion of the tube 24' and is bonded thereto as described previously. The lower end 48 of the coating 28' is spaced from the lower end 44 of the tube 24' in order to avoid electrolytic conduction between the bulb 42 and the salt bridge solution 14' contained in the annular space between the tubes 12' and 24'. As seen in FIG. 2, the reference electrode internal half cell 22' is disposed in such annular space to contact the electrolyte 14'.

Preferably the lower end 32' of the salt bridge tube 12' extends axially with respect to the tube 24' to provide an enlarged cylindrical surface which forms the opening 16' in which the sensing electrode 40 is mounted. The lower end 32' of the tube 12' is fused to the liquid junction structure 28'. The electrode assembly 10' is fabricated in the same manner as the electrode 10 described hereinbefore except that the ion sensitive bulb 42 is not formed onto the end of tube 24' until after the liquid junction structure 28' has been formed and the tubes 12' and 24' fused together into an integral assembly. Because the opening 16' is defined by an enlarged cylindrical surface, if desired the coating forming the liquid junction structure could be applied to such surface rather than to the outer surface of tube 24' during the fabrication procedure.

It will be appreciated that by the construction of the electrode 10', the liquid junction structure 28' is positioned very closely to the ion sensitive barrier 42 so that only relatively small samples are required for making ion potential measurements. Furthermore, the resulting assembly is very rugged, is capable of withstanding high temperatures and is not attacked by corrosive solutions as are combination electrode assemblies employing rubber or plastic rings for sealing the inner and outer glass tubes thereof.

A variety of combination electrodes as illustrated in FIG. 2 have been constructed and tested. The composition of the liquid junction structures, the flow rates and the resistances of these electrodes are shown in Table I:

TABLE I

| Electrode No. | Composition | Flow rate (μl./hr.) | Resistance (ohms) |
|---|---|---|---|
| 1 | Ceramic slip (wet) | 10.5 | 14,000 |
| 2 | Dry ceramic in water | 60.5 | 200 |
| 3 | .75 g. alundum, .25 g. 7720 glass, 2.0 g. 5% Parlodion. | 15 | 22,000 |
| 4 | .75 g. alundum, .25 g. 7720 glass, 2.0 g. THF. | 20.3 | 22,000 |
| 5 | 11.4 g. alundum, .6 g. 009 glass, 8.0 g. water. | 7.9 | 2,500 |
| 6 | 6.0 g. alundum, 6.0 g. dry ceramic, 7.0 g. water. | 30 | 600 |
| 7 | 9.5 g. dry ceramic, .5 g. glass, 6.0 g. water. | 3.9 | 1,000 |
| 8 | 2.5 g. ceramic slip (wet), 7.5 g. alundum. | 7.6 | 800 |
| 9 | 6.0 g. dry ceramic, 6.0 g. alundum, 8.0 g. water. | 6.3 | 700 |

The glass tubes 12' and 24' of each of the electrodes referred to in Table I above were formed of Corning 7720 borosilicate glass. The liquid junction structure of electrode No. 1 was formed of Silk Tex ceramic slip. As will be noted, this electrode had a rather high resistance. The electrode performed well but the flow rates were sometimes inconsistent and relatively low. The liquid junction structure of electrode No. 2 was formed of two layers of Silk Tex ceramic slip. The ceramic slip had been allowed to dry and thereafter mixed with water to apply in the form of the two layers on the inner glass tube 24'. The two layers were fired separately and great care was taken to seal the outer glass tube to only the thicker portions of the coating thereby providing a more porous structure. The flow rate of electrode No. 2 was substantially higher than that of electrode No. 1, and the resistance was substantially lower.

Electrode No. 3 performed well but it was somewhat difficult to form the liquid junction structure due to occasional flaking off of the coating material.

Electrode No. 4 performed well but had a rather high resistance. The 009 glass utilized in forming the liquid junction structure of electrode No. 5 is a Corning potash soda lead glass. This electrode had a substantially lower resistance and flow rate than electrode No. 4. Electrode No. 6 employed Silk Tex ceramic in its liquid junction structure and was found to have good resistance and flow rate characteristics. Electrode No. 7 had a flow rate somewhat less than that of electrode No. 6 and a higher resistance. Wards' Artware Casting Body ceramic slip was used in the construction of the liquid junction structure for electrode No. 8 while Beckman Type A ceramic was used as the ceramic in the junction structure for electrode No. 9. The flow rate and resistance of electrode No. 8 was somewhat irregular but electrode No. 9 performed well.

The compositions in Table I for electrodes Nos. 6 and 9 are the preferred compositions for the liquid junction structure of the present invention because of their performance, ease of manufacture and reproducibility. However, it will be appreciated that any other compositions disclosed in Table I are operable and may be more advantageous for certain applications than electrodes Nos. 6 and 9. Moreover, as stated previously, by adjusting the ratios of the constituents used in making the liquid junction structures and altering the selections of such constituents, liquid junction structures providing different flow rates and resistances can be obtained.

Although several embodiments of the invention have been disclosed herein for purposes of illustration, it will be understood that various changes can be made in the form, details, arrangement and proportions of the various parts and constituents in such embodiments without departing from the spirit and scope of the invention as defined by the appended claims.

What is claimed is:

1. In an electrochemical electrode assembly including a glass salt bridge tube having an opening therein and a second glass tube positioned in said opening, the improvement which comprises a coating of porous material bonded to the outer surface of said second tube and to the surface of said salt bridge tube forming said opening, said material containing either a ceramic or an admixture of particles of glass and inert particles, and said coating extending from the interior to the exterior of said salt bridge tube to provide a liquid junction structure.

2. An electrode assembly as set forth in claim 1 wherein said coating covers an annular surface of said second tube to thereby provide an annular liquid junction structure.

3. An electrode assembly as set forth in claim 1 wherein said salt bridge tube has an open end forming said opening, said second tube being concentrically mounted within said salt bridge tube and extending beyond said open end thereof, and there is provided an ion sensitive barrier sealed to and closing said second tube.

4. An electrode assembly as set forth in claim 3 wherein the outer terminus of said coating is spaced from said barrier.

5. An electrode assembly as set forth in claim 1 wherein said second tube is closed.

6. An electrode assembly as set forth in claim 1 wherein said coating contains a ceramic and alundum.

7. A method of forming a liquid junction structure for a glass salt bridge tube having an opening therein comprising the steps of:
providing a second glass tube having an outer diameter less than the diameter of the opening in said salt bridge tube;
applying a coating onto the outer surface of said second tube, said coating containing either a ceramic or an admixture of particles of glass and inert particles;
inserting said second tube within said opening in said salt bridge tube with said coating positioned adjacent the surface of said salt bridge tube forming said opening; and
heating both said tubes in the region of said coating until the coating partially fuses and adheres by fusion to said second tube and said salt bridge tube fuses to said coating.

8. A method of forming a liquid junction structure for a glass salt bridge tube comprising the steps of:
providing a second glass tube having an outer diameter less than the diameter of the opening in said salt bridge tube;
applying a coating onto the surface of said salt bridge tube forming said opening, said coating containing either a ceramic or an admixture of particles of glass and inert particles;
inserting said second tube within said opening in said salt bridge tube; and
heating both said tubes in the region of said coating until the coating partially fuses and adheres by fusion to said salt bridge tube and said second tube.

9. A method of forming a liquid junction structure for a glass salt bridge tube comprising the steps of:
providing a second glass tube having an outer diameter less than the diameter of the opening in said salt bridge tube;
applying a coating onto the surface of said salt bridge tube forming said opening, said coating containing either a ceramic or an admixture of particles of glass and inert particles;
heating said coating until the coating partially fuses and adheres by fusion to said second tube;
inserting said second tube within said opening in said salt bridge tube with said coating positioned adjacent the surface of said salt bridge tube forming said opening; and
heating said salt bridge tube in the region of said coating until said salt bridge tube fuses to said coating.

References Cited

UNITED STATES PATENTS

| 2,925,370 | 2/1960 | Rohrer | 204—195 F |
| 3,264,205 | 8/1966 | Leonard et al. | 204—195 F |

GERALD L. KAPLAN, Primary Examiner

U.S. Cl. X.R.

29—592; 204—195 G